US012588653B2

(12) United States Patent　　　　(10) Patent No.: US 12,588,653 B2
Harris et al.　　　　　　　　　　　(45) Date of Patent:　Mar. 31, 2026

(54) SLOW FEEDER FOR FEEDING FORAGE TO AN EQUID

(71) Applicants:Mars, Incorporated, McLean, VA (US); Università degli Studi di Torino, Turin (IT)

(72) Inventors: Patricia Harris, Ipswich (GB); Emanuela Valle, Turin (IT); Federica Raspa, Turin (IT); Clara Bordin, Turin (IT); Andrea D. Ellis, West Bridgford (GB)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 18/880,719

(22) PCT Filed: Jun. 16, 2023

(86) PCT No.: PCT/US2023/068595
§ 371 (c)(1),
(2) Date: Jan. 2, 2025

(87) PCT Pub. No.: WO2024/011009
PCT Pub. Date: Jan. 11, 2024

(65) Prior Publication Data
US 2026/0000051 A1　　Jan. 1, 2026

Related U.S. Application Data

(60) Provisional application No. 63/358,392, filed on Jul. 5, 2022.

(51) Int. Cl.
*A01K 1/10*　　　　(2006.01)
(52) U.S. Cl.
CPC ................................... *A01K 1/105* (2013.01)

(58) Field of Classification Search
None
See application file for complete search history.

(56) References Cited

U.S. PATENT DOCUMENTS

| | | | | |
|---|---|---|---|---|
| 387,821 | A * | 8/1888 | Smith | A01K 5/01 119/65 |
| 7,895,974 | B2 * | 3/2011 | Brickell | A01K 5/01 119/61.2 |

(Continued)

FOREIGN PATENT DOCUMENTS

DE　　　202012004257 U1　　5/2012

OTHER PUBLICATIONS

Ellis et al., "Effect of forage presentation on feed intake behaviour in stabled horses," Applied Animal Behaviour Science, published Apr. 2015, retrieved from https://www.sciencedirect.com/science/article/abs/pii/S0168159115000283 (8 pages).

(Continued)

*Primary Examiner* — Peter M Poon
*Assistant Examiner* — Danielle A Clerkley
(74) *Attorney, Agent, or Firm* — Bookoff McAndrews, PLLC

(57)　　　　　ABSTRACT

A slow-feeder for feeding forage to an equid includes a container to hold the forage. The slow-feeder includes a feeding restrictor that is provided in the container on the forage, and that has apertures through which the equid extracts the forage from the container. The slow-feeder includes straps that connect the feeding restrictor to the container, that provide tension between the feeding restrictor and the container, and that permit the feeding restrictor to translate within the container in a vertical direction.

20 Claims, 4 Drawing Sheets

(56) References Cited

U.S. PATENT DOCUMENTS

| | | | | |
|---|---|---|---|---|
| 9,668,454 | B2 * | 6/2017 | Johnson | A01K 5/01 |
| 10,426,133 | B2 | 10/2019 | Oliver et al. | |
| 11,071,278 | B2 | 7/2021 | Bruggink et al. | |
| 2021/0315184 | A1 | 10/2021 | Bruggink et al. | |

OTHER PUBLICATIONS

Ellis et al., "The effect of presenting forage in multi-layered haynets and at multiple sites on night time budgets of stabled horses," Applied Animal Behaviour Science, published Oct. 2015, retrieved from https://www.sciencedirect.com/science/article/abs/pii/S0168159115002154 (8 pages).

Harris et al., "Review: Feeding conserved forage to horses: recent advances and recommendations," Animal, published 2017, retrieved from https://pdf.sciencedirectassets.com/778414/1-s2.0-S1751731117X71279/1-s2.0-S1751731116002469/main.pdf (10 pages).

Hodgson et al., "Posture and Pull Pressure by Horses When Eating Hay or Haylage from a Hay Net Hung at Various Positions," Animals, published Oct. 31, 2022, retrieved from https://pmc.ncbi.nlm.nih.gov/articles/PMC9659009/pdf/animals-12-02999.pdf (18 pages).

* cited by examiner

400

410

PROVIDE A SLOW-FEEDER FOR FEEDING FORAGE TO AN EQUID, THE SLOW-FEEDER COMPRISING: A CONTAINER TO HOLD THE FORAGE; A FEEDING RESTRICTOR PROVIDED IN THE CONTAINER ON THE FORAGE, AND HAVING APERTURES THROUGH WHICH THE EQUID EXTRACTS THE FORAGE FROM THE CONTAINER; AND STRAPS THAT CONNECT THE FEEDING RESTRICTOR TO THE CONTAINER, THAT PROVIDE TENSION BETWEEN THE FEEDING RESTRICTOR AND THE CONTAINER, AND THAT PERMIT THE FEEDING RESTRICTOR TO TRANSLATE WITHIN THE CONTAINER IN A VERTICAL DIRECTION

420

USE THE SLOW-FEEDER TO FEED THE EQUID

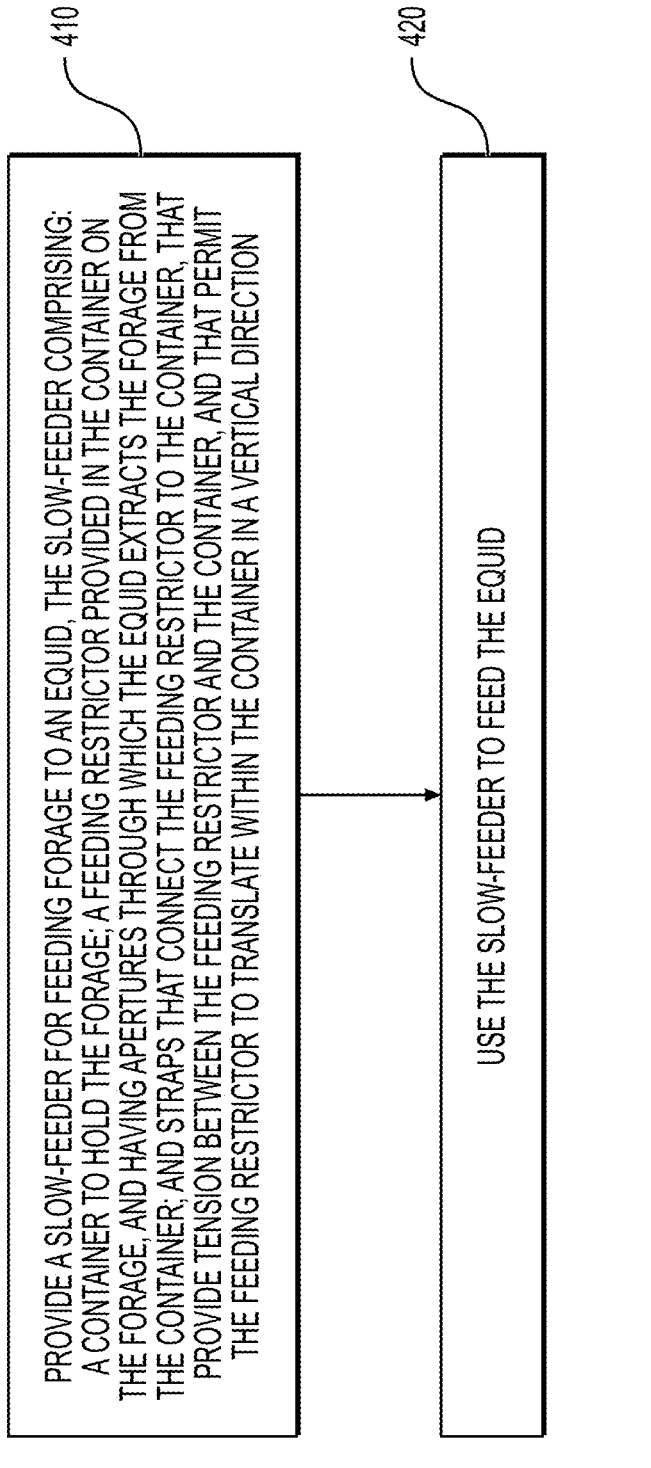

*FIG. 4*

SLOW FEEDER FOR FEEDING FORAGE TO AN EQUID

CROSS-REFERENCE TO RELATED APPLICATION

This is a National Stage Application under 35 U.S.C. § 371 of International Application No. PCT/US2023/068595, filed on Jun. 16, 2023, which claims priority to U.S. Provisional Application No. 63/358,392, filed on Jul. 5, 2022, the entireties of which are incorporated herein by reference.

TECHNICAL FIELD

The present disclosure relates to a device and method for feeding an animal. In particular, the present disclosure relates to a slow-feeder and method for slow-feeding forage to an equid. To this end, the present disclosure provides a slow-feeder that is modular and configurable for the individual equid, that more naturally follows the movement of the equid when the equid extracts forage, and that reduces the amount of force needed to remove forage from the container while adequately extending the time spent foraging and therefore enabling the amount of daily consumed forage to be restricted without significant compromise to welfare.

BACKGROUND

Naturally, equids (e.g. horses) spend most of the day roaming and foraging in an externally variable environment as part of a herd. As non-ruminant herbivores they are well suited to a high fibre, low starch diet (i.e. predominantly forage). They rarely fast voluntarily for more than 2-4 hrs at a time and would naturally forage for 16-18 hrs a day. Modern horse management often brings horses into small-enclosed, isolated environments (e.g stables) and/or limits the feeding occasions resulting in an increased risk of behavioural and clinical issues e.g. horses that have periods of more than 4-6 hrs between forage feeds are at increased risk of developing gastric ulcers. In a stable, an equid is typically fed at specific feed times that are suitable for humans rather than them being able to mimic natural grazing behaviour. In addition, because many horses (up to 60% of the equids used for leisure/pleasure purposes) are often over-weight or prone to weight gain they are not provided with ad-libitum feed (where they make the choice of when to forage or not) but rather they are fed restricted (i.e. less than appetite) amounts of feed and especially forage at set times in order to reduce the calorie intake. Mitigation feeding strategies and methods are therefore required in such feed restricted schedules to reduce the risk of adverse clinical and behavioural issues that might arise (such as Gastric Ulcers, and Behavioural Stereotypies).

A common method to mitigate the adverse effects of such a feed-restricted schedule is to extend the time the equid forages for food whilst limiting the actual amount of forage the equid consumes. To do so, a related-art technique uses a hay net (filled with a given amount of forage) including small apertures from which the equid extracts forage. However, in order to sufficiently extend intake time, the holes need to be fairly small and extracting may result in considerable pressure on the neck and unnatural eating positions. Some equids may find it difficult to extract certain forages from the hay net and therefore may express frustration behaviours.

Another related-art technique uses a slow-feeder which is typically placed on the ground. This involves the use of a container having an open-end for access to forage, and a feeding restrictor that rests on top of the forage. The feeding restrictor includes apertures from which the equid removes forage. As the forage level in the container decreases based on consumption, the feeding restrictor translates downwards but should always rests on top of the forage. The container typically retains the feeding restrictor by using vertical bars or guides. However, in some cases, the feeding restrictor may tilt within the container and become stuck in the vertical bars or guides, which therefore causes a failure of the feeding restrictor to move freely downwards within the container. Moreover, the feeding restrictor does not translate vertically in a manner that corresponds to movement of the equid when removing the forage from the container. Accordingly, the slow-feeder might increase the amount of force required to extract the forage through the feeding restrictor, which proves harmful to the equid and increases the risk of the container being lifted or overturned by the equid.

Moreover, related-art techniques and devices often do not always restrict the rate at which the equid forages or the amount of forage consumed by the equid. For instance, related-art techniques often do not account for, or adapt to, equid size, age, medical condition, needs, etc.

Accordingly, a need exists for a slow-feeder that is modular and configurable for the individual equid, that more naturally follows the movement of the equid when the equid extracts forage, and that reduces the amount of force needed to remove forage from the container while adequately extending the time spent foraging and therefore enabling the amount of daily consumed forage to be restricted without significant compromise to welfare.

SUMMARY

Embodiments of the present disclosure relate to, among other things, a slow-feeder for feeding forage to an equid. According to an example embodiment, a slow-feeder for feeding forage to an equid includes a container to hold the forage; a feeding restrictor provided in the container on the forage, and having apertures through which the equid extracts the forage from the container; and straps that connect the feeding restrictor to the container, that provide tension between the feeding restrictor and the container, and that permit the feeding restrictor to translate within the container in a vertical direction.

Each of the embodiments disclosed herein may include one or more of the features described in connection with any of the other disclosed embodiments.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIG. 4 is a flowchart of providing and using a slow-feeder according to an example embodiment.

DETAILED DESCRIPTION

Some example embodiments of the present disclosure provide a slow-feeder for feeding forage to an equid includes a container to hold the forage; a feeding restrictor provided in the container on the forage, and having apertures through which the equid extracts the forage from the container; and straps that connect the feeding restrictor to the container, that provide tension between the feeding restrictor and the container, and that permit the feeding restrictor to translate within the container in a vertical direction.

By using the straps, the slow-feeder provides a dissipation of force required to extract the forage from the container through the apertures of the feeding restrictor. Accordingly, the slow-feeder reduces the risk of injury or unpleasantness to the equid during foraging, improves feeding of the equid, reduces the risk of the container being displaced by the equid, and helps to prevent tilting of the restrictor and promotes a more natural movement of the equid during feeding.

Moreover, the slow-feeder may include modular components such that the dimensions, characteristics, tension, etc., may be adjusted in order to accommodate equids of different sizes, equids of different physiological characteristics, equids of different medical conditions, etc.

In this way, some embodiments herein provide a slow-feeder that is modular and configurable for the equid, that more naturally follows the movement of the equid when the equid extracts forage, and that reduces/modulates the amount of force needed to remove forage from the container while adequately extending the time for foraging and restricting the amount of consumed forage.

Although the example embodiments describe a slow-feeder for feeding equids, it should be understood that the embodiments herein are applicable to other types of animals.

Figure 1:
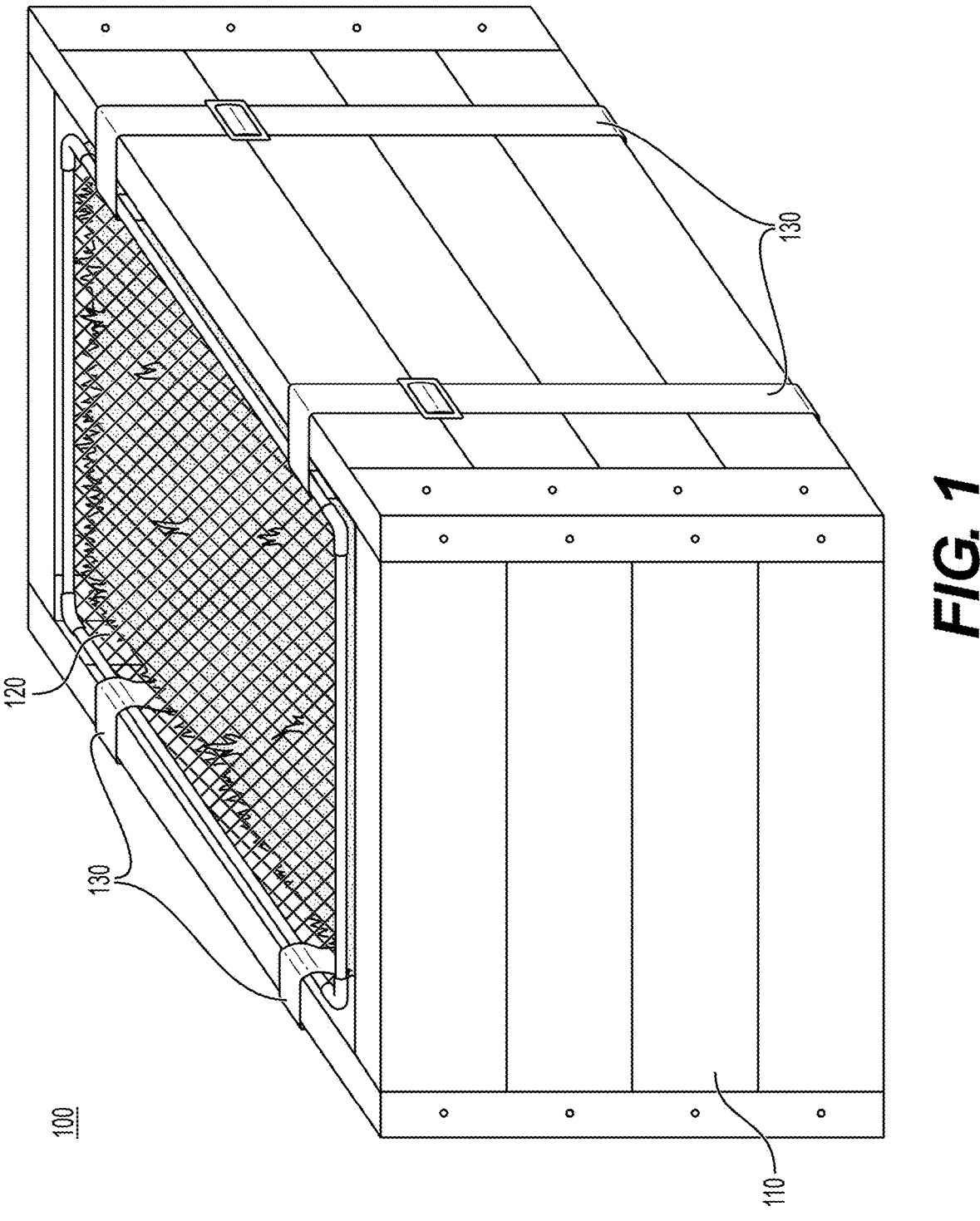
FIG. 1 is a perspective view of a slow-feeder according to an example embodiment.

FIG. 1 is a perspective view of a slow-feeder 100 according to an example embodiment. As shown in FIG. 1, a slow-feeder 100 for feeding forage to an equid includes a container 110 to hold the forage; a feeding restrictor 120 provided in the container 110 on the forage, and having apertures through which the equid extracts the forage from the container 110; and straps 130 that connect the feeding restrictor 120 to the container 110, that provide tension between the feeding restrictor 120 and the container 110 in a horizontal direction, a vertical direction, or both, and that permit the feeding restrictor 120 to translate within the container 110 in a vertical direction.

The container 110 may store forage for the equid to consume. The container 110 may include a bottom surface on which forage is placed, and may include an open top surface that permits the equid to access the forage. Further, the container may include one or more sidewalls that extend from the bottom surface to the top surface.

The container 110 may be any suitable shape, such as rectangular, circular, square, etc. Further, the container 110 may have any suitable dimensions. As an example, the container 110 may include a height of two feet, a width of three feet, and a depth of two and a half feet. The container 110 may be comprised of any suitable material, such as plastic, metal, wood, etc.

In some cases, the container 110 may include modular components that permit the dimensions of the container 110 to be adjusted to accommodate equid size, age, medical condition, needs, etc. For example, the container 110 may include modular slats that permit the height, width, and/or depth of the container 110 to be adjusted. In this way, the container 110 may be adjusted to account for equid size, age, medical condition, needs, etc., thereby improving comfort of feeding and adequately restricting feed duration and amount.

The feeding restrictor 120 may restrict access to the forage in order to reduce the amount of forage consumed (or to reduce the speed at which the equid consumes the forage) and to increase the amount of time spent foraging. The feeding restrictor 120 may include a set of sides (e.g., outer frames), and an interior portion having apertures.

The feeding restrictor 120 may be any suitable shape, such as rectangular, circular, oval, square, etc. Moreover, the feeding restrictor 120 may have a shape that corresponds to the shape of the container 110. For example, if the container 110 is rectangular, then the feeding restrictor 120 is rectangular. Alternatively, the feeding restrictor 120 may include a shape that is different than the shape of the container 110.

The feeding restrictor 120 may have any suitable dimensions. Moreover, the feeding restrictor 120 may have dimensions that allow the feeding restrictor 120 to fit in the container 110, and translate vertically within the container 110. For example, a tolerance between the feeding restrictor 120 and the container 110 may be such that the equid cannot access the forage by bypassing the feeding restrictor 120.

The sides of the feeding restrictor 120 may be comprised of any suitable material, such as plastic, metal, wood, etc. The interior portion of the feeding restrictor 120 may be comprised of any suitable material, such as fabric, textile, plastic, etc.

The feeding restrictor 120 may include any number of apertures. Further, the apertures may have any suitable shape and dimensions. In some cases, the apertures may be modular or configurable such that the size and/or number of apertures may be adjusted.

The interior portion of the feeding restrictor 120 may have any suitable tension that permits the forage to be extracted through the apertures while also adequately restricting the amount of forage that is consumed and increasing the amount of time spent foraging.

The straps 130 may connect the feeding restrictor 120 to the container 110, provide tension between the feeding restrictor 120 and the container 110 in the horizontal direction, vertical direction, or both, and permit the feeding restrictor 120 to translate within the container 110 in the vertical direction.

The straps 130 may have any suitable shape and/or suitable dimensions. Moreover, the straps 130 may have a suitable tension. The straps 130 may be elastic or may not be elastic. In some cases, the straps 130 may be modular such that the straps 130 may be adjusted, or replaced, in order to accommodate equid size, age, medical condition, needs, etc.

The straps 130 may be fastened to the container 110 via any suitable mechanism. For example, the container 110 may include through-holes, and the straps 130 may be placed within the through-holes. As another example, the container 110 may include hooks, rings, etc., and the straps 130 may be placed within the hooks, rings, etc., in order to fasten to the container 110.

The straps 130 may fasten to the feeding restrictor 120 via any suitable mechanism. For example, the straps 130 may be placed through apertures of the interior portion of the feeding restrictor 120. Alternatively, the straps 130 may be fastened to hooks, rings, through-holes, etc., of the sides of the feeding restrictor 120.

The straps 130 may provide a particular tension between the container 110 and the feeding restrictor 120 in the horizontal direction, vertical direction, or both. For example, the straps 130 may provide a high amount of tension between the container 110 and the feeding restrictor 120 in the horizontal direction such that a top surface of the feeding restrictor 120 remains substantially planar while the equid is foraging. Alternatively, the straps may provide a lower amount of tension between the container 110 and the feeding restrictor 120 in the horizontal direction such that the top surface of the feeding restrictor 120 can shift more easily while the equid is foraging. The tension may be chosen such that the straps 130 accommodate equid size, age, medical condition, needs, etc.

By usage of the straps 130, the feeding restrictor 120 more naturally follows the movement of the equid when the equid extracts forage, and reduces the amount of force needed to remove forage from the container 110 while adequately extending the time for foraging and restricting the amount of consumed forage.

In a particular implementation, the container 110 is a wooden box including two sides made of plexi-glass having a thickness of 5 mm. The feeding restrictor 120 (e.g., a hay net having 3.5×3.5 cm holes) is disposed within the container 110. The container 110 has holes at each corner of the bottom of the container 110. The straps 130 (e.g., 3 cm wide by a variable length according to the particular need) enter inside the container 110 through the holes, pass across the feeding restrictor 120, and then are fixed through metal tight straps 130 (e.g., 3×4 cm) in order to give the right tension on the basis of the volume of the forage (e.g., hay) present inside the container 110 or the configurable range of motion. In this way, the feeding restrictor 120 rises and falls according to the volume and the kilograms of hay inside the container 110. Moreover, allowing this type of movement, the equid can play with and lift up the feeding restrictor 120 reducing the stress caused by the restricted feeding consumption, but without removing the feeding restrictor 120 from the container 110 due to the straps 130. The system has a sort of elasticity in the movement due to the metal tight straps 130.

Figure 2:
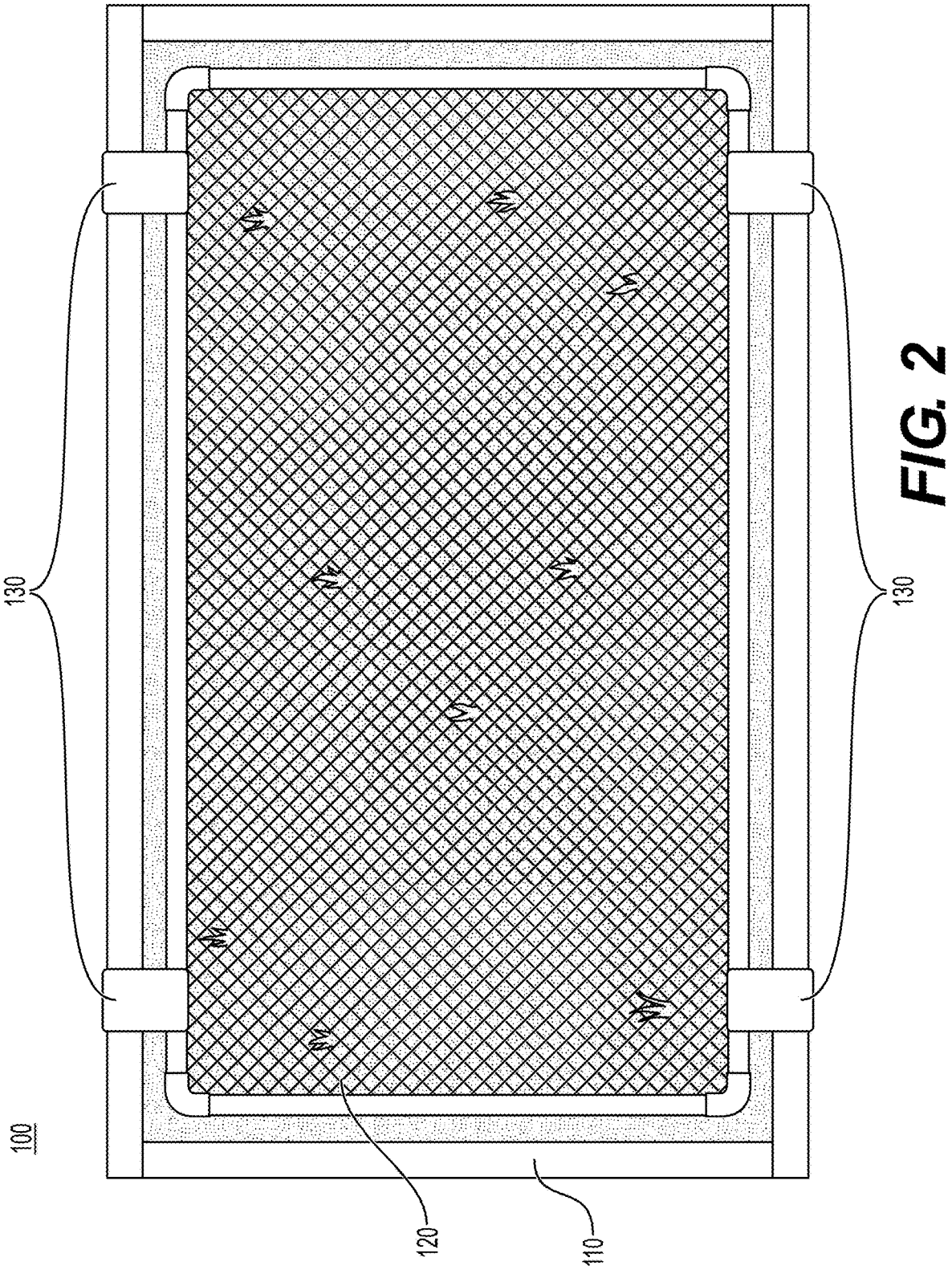
FIG. 2 is a top view of a slow-feeder according to an example embodiment.

FIG. 2 is a top view of the slow-feeder 100 according to an example embodiment. As shown in FIG. 2, the container 110 defines a rectangular opening via the open top surface of the container 110. The feeding restrictor 120 is placed within the container 110 such that the feeding restrictor 120 is allowed to translate vertically within the container 110. The straps 130 fasten the feeding restrictor 120 to the container 110 while allowing the feeding restrictor 120 to translate vertically within the container 110.

Figure 3:
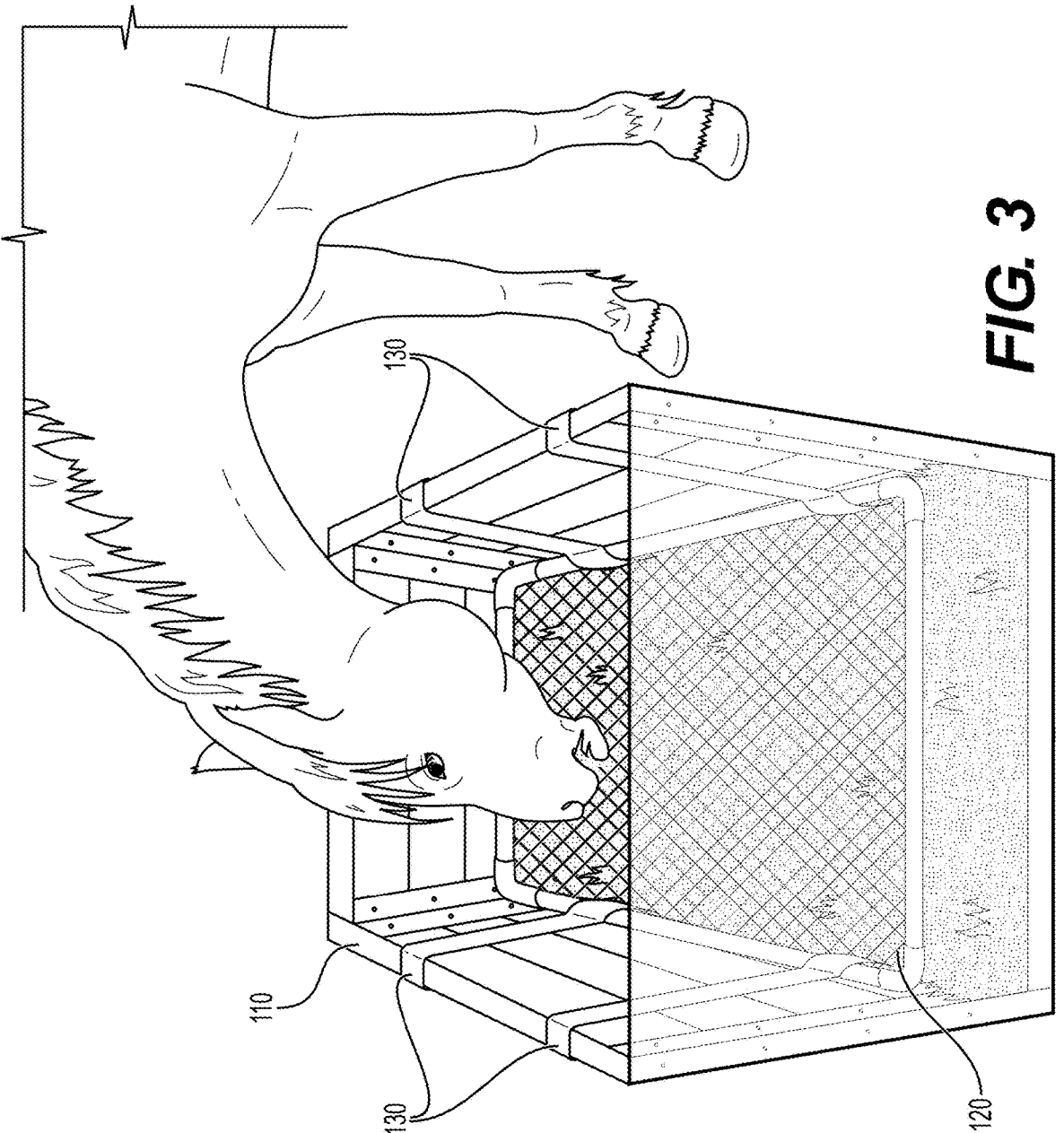
FIG. 3 is a diagram of the slow-feeder during feeding of an equid according to an example embodiment.

FIG. 3 is a diagram of the slow-feeder during feeding of an equid according to an example embodiment. As shown in FIG. 3, the forage rests on the bottom surface of the container 110. The feeding restrictor 120 rests on a top surface of the forage. As the equid pushes the feeding restrictor 120 downwards towards the forage, the straps 130 permit the feeding restrictor 120 to move downwards to an extent. The straps 130 provide tension between the feeding restrictor 120 and the container 110 in the horizontal direction, vertical direction, or both, and allow the feeding restrictor 120 to translate vertically within the container 110. As shown, the equid extracts forage from the container 110 through the apertures of the feeding restrictor 120.

The slow-feeder 110, by usage of the straps 130, provides a feeding restrictor 120 that more naturally follows the movement of the equid when the equid extracts forage, and reduces the amount of force needed to remove forage from the container 110 while adequately extending the time for foraging restricting the amount of consumed forage.

FIG. 4 is a flowchart of providing and using a slow-feeder according to an example embodiment.

As shown in FIG. 4, a process 400 may include providing a slow-feeder for feeding forage to an equid, the slow-feeder comprising: a container to hold the forage; a feeding restrictor provided in the container on the forage, and having apertures through which the equid extracts the forage from the container; and straps that connect the feeding restrictor to the container, that provide tension between the feeding restrictor and the container, and that permit the feeding restrictor to translate within the container in a vertical direction (operation 410), and using the slow-feeder to feed the equid (operation 420).

In this way, some embodiments herein provide a slow-feeder that is modular and configurable for the equid, that more naturally follows the movement of the equid when the equid extracts forage, and that reduces the amount of force needed to remove forage from the container while adequately extending the time for foraging and restricting the amount of consumed forage.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

We claim:

1. A feeder comprising:
   a container including a first surface, a second open surface, and one or more sidewalls extending there between;
   a feeding restrictor including apertures, wherein the feeding restrictor is provided within the container between the first surface and second open surface; and
   one or more straps that connect the feeding restrictor to the container and further extend around an exterior portion of one or more sidewalls.

2. The feeder of claim 1, wherein the container of the feeder includes modular components enabling adjustment of one or more dimensions of the container.

3. The feeder of claim 1, wherein the container is configured to hold forage between the first surface and the feeding restrictor.

4. The feeder of claim 3, wherein the feeding restrictor is configured to allow the forage to be extracted through the apertures.

5. The feeder of claim 1, wherein the apertures of the feeding restrictor are modular in order to adjust a size or a number of apertures.

6. The feeder of claim 1, wherein the one or more straps provide tension between the feeding restrictor and the container in a horizontal direction, a vertical direction or both.

7. The feeder of claim 1, wherein the container includes one or more holes, each of the one or more holes corresponding to a respective strap of the one or more straps and through which the strap passes.

8. The feeder of claim 7, wherein each of the one or more straps is configured with a buckle mechanism to which a corresponding strap is fixed after passing across the feeding restrictor.

9. The feeder of claim 8, wherein the buckle mechanism is configured to adjust the corresponding strap based on one or more characteristics of a user of the feeder or a volume of forage held by the container.

10. The feeder of claim 1, wherein the one or more straps prevent the feeding restrictor from being removed from the container.

11. A feeder comprising:

a container including a first surface, a second open surface, and one or more sidewalls extending there between;

a feeding restrictor including apertures, wherein the feeding restrictor is provided within the container between the first surface and the second open surface; and one or more straps that connect the feeding restrictor to the container and further extend around an exterior portion of the one or more sidewalls, the one or more straps configured to provide tension between the feeding restrictor and the container.

12. The feeder of claim 11, wherein the container of the feeder includes modular components enabling adjustment of one or more dimensions of the container.

13. The feeder of claim 11, wherein the container is configured to hold forage between the first surface and the feeding restrictor.

14. The feeder of claim 13, wherein the feeding restrictor is configured to allow the forage to be extracted through the apertures.

15. The feeder of claim 11, wherein the one or more straps are further configured to translate the feeding restrictor vertically in relation to a volume of forage within the container.

16. The feeder of claim 11, wherein the apertures of the feeding restrictor are modular in order to adjust a size or a number of apertures.

17. The feeder of claim 11, wherein the one or more straps are further configured such that the tension provided by the one or more straps in a horizontal direction maintains the feeding restrictor substantially planar with the first surface.

18. The feeder of claim 11, wherein the one or more straps prevent the feeding restrictor from being removed from the container.

19. The feeder of claim 11, wherein the one or more straps further configured to be modular so that the one or more straps may be adjusted or replaced.

20. A method for feeding forage to an equid, comprising:

using a feeder to feed an equid, the feeder including:

a container including a first surface, a second open surface, and one or more sidewalls extending there between, the container configured to hold forage;

a feeding restrictor including apertures through which the equid extracts the forage from the container, wherein the feeding restrictor is provided within the container between the first surface and the second open surface; and one or more straps that connect the feeding restrictor to the container and further extend around an exterior portion of the one or more sidewalls.

* * * * *